(12) United States Patent
Sawai

(10) Patent No.: US 12,400,460 B2
(45) Date of Patent: Aug. 26, 2025

(54) MONITORING DEVICE, STORAGE MEDIUM STORING COMPUTER PROGRAM FOR MONITORING, AND MONITORING METHOD

(71) Applicant: TOYOTA JIDOSHA KABUSHIKI KAISHA, Toyota (JP)

(72) Inventor: Shunichiroh Sawai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 481 days.

(21) Appl. No.: 17/976,125

(22) Filed: Oct. 28, 2022

(65) Prior Publication Data

US 2023/0186653 A1 Jun. 15, 2023

(30) Foreign Application Priority Data

Dec. 10, 2021 (JP) .................................. 2021-200697

(51) Int. Cl.
| | | |
|---|---|---|
| *G06V 20/59* | (2022.01) | |
| *B60Q 9/00* | (2006.01) | |
| *B60W 50/14* | (2020.01) | |
| *B60W 60/00* | (2020.01) | |
| *G06V 10/25* | (2022.01) | |
| *G06V 20/56* | (2022.01) | |

(52) U.S. Cl.
CPC ............ *G06V 20/597* (2022.01); *B60Q 9/00* (2013.01); *G06V 10/25* (2022.01); *G06V 20/588* (2022.01); *B60W 50/14* (2013.01); *B60W 60/0053* (2020.02); *B60W 2540/229* (2020.02)

(58) Field of Classification Search
CPC .... G06V 20/597; G06V 10/25; G06V 20/588; G06V 10/82; G06V 20/56; G06V 40/161; G06V 40/18; B60Q 9/00; B60W 50/14; B60W 60/0053; B60W 2540/229; B60W 2554/40; B60W 40/08; B60W 2040/0818
See application file for complete search history.

(56) References Cited

U.S. PATENT DOCUMENTS

| | | | |
|---|---|---|---|
| 9,925,872 B1 * | 3/2018 | Alasry | ................. B60W 50/12 |
| 2009/0231146 A1 | 9/2009 | Fujita | |
| 2012/0326914 A1 * | 12/2012 | Nagy | ..................... G01S 7/415 |
| | | | 342/27 |
| 2019/0051165 A1 * | 2/2019 | Harer | ...................... G08G 1/22 |
| 2019/0326669 A1 * | 10/2019 | Gaines | ................ G08G 1/0116 |
| 2020/0198465 A1 * | 6/2020 | Tanabe | ................... B60N 2/143 |
| 2020/0225343 A1 * | 7/2020 | Lee | ........................ B60W 50/14 |

(Continued)

FOREIGN PATENT DOCUMENTS

| | | |
|---|---|---|
| JP | H10-315800 A | 12/1998 |
| JP | 2006-318159 A | 11/2006 |

(Continued)

*Primary Examiner* — Santiago Garcia
(74) *Attorney, Agent, or Firm* — Oliff PLC

(57) ABSTRACT

A monitoring device comprises a processor configured to estimate whether or not a non-stimulating environment has appeared in front of a driver which may cause the driver to have a lower alertness level or to engage in unfocused driving, based on multiple images taken of an environment ahead of a vehicle across a predetermined time period, and to act on the driver via a notification unit to increase a level of contribution to driving when the non-stimulating environment has appeared ahead.

9 Claims, 7 Drawing Sheets

(56) References Cited

U.S. PATENT DOCUMENTS

| | | | |
|---|---|---|---|
| 2021/0188289 A1* | 6/2021 | Oba | G08G 1/16 |
| 2021/0253111 A1* | 8/2021 | Iwase | G06V 20/597 |
| 2021/0291837 A1 | 9/2021 | Aizawa et al. | |
| 2022/0161813 A1* | 5/2022 | Oba | G08G 1/09675 |

FOREIGN PATENT DOCUMENTS

| | | | |
|---|---|---|---|
| JP | 2009-018777 A | 1/2009 | |
| JP | 2009-208739 A | 9/2009 | |
| JP | 2009-230506 A | 10/2009 | |
| JP | 2018-151907 A | 9/2018 | |
| JP | 2019-046068 A | 3/2019 | |
| WO | 2007/029455 A1 | 3/2007 | |
| WO | 2017/134876 A1 | 8/2017 | |

* cited by examiner

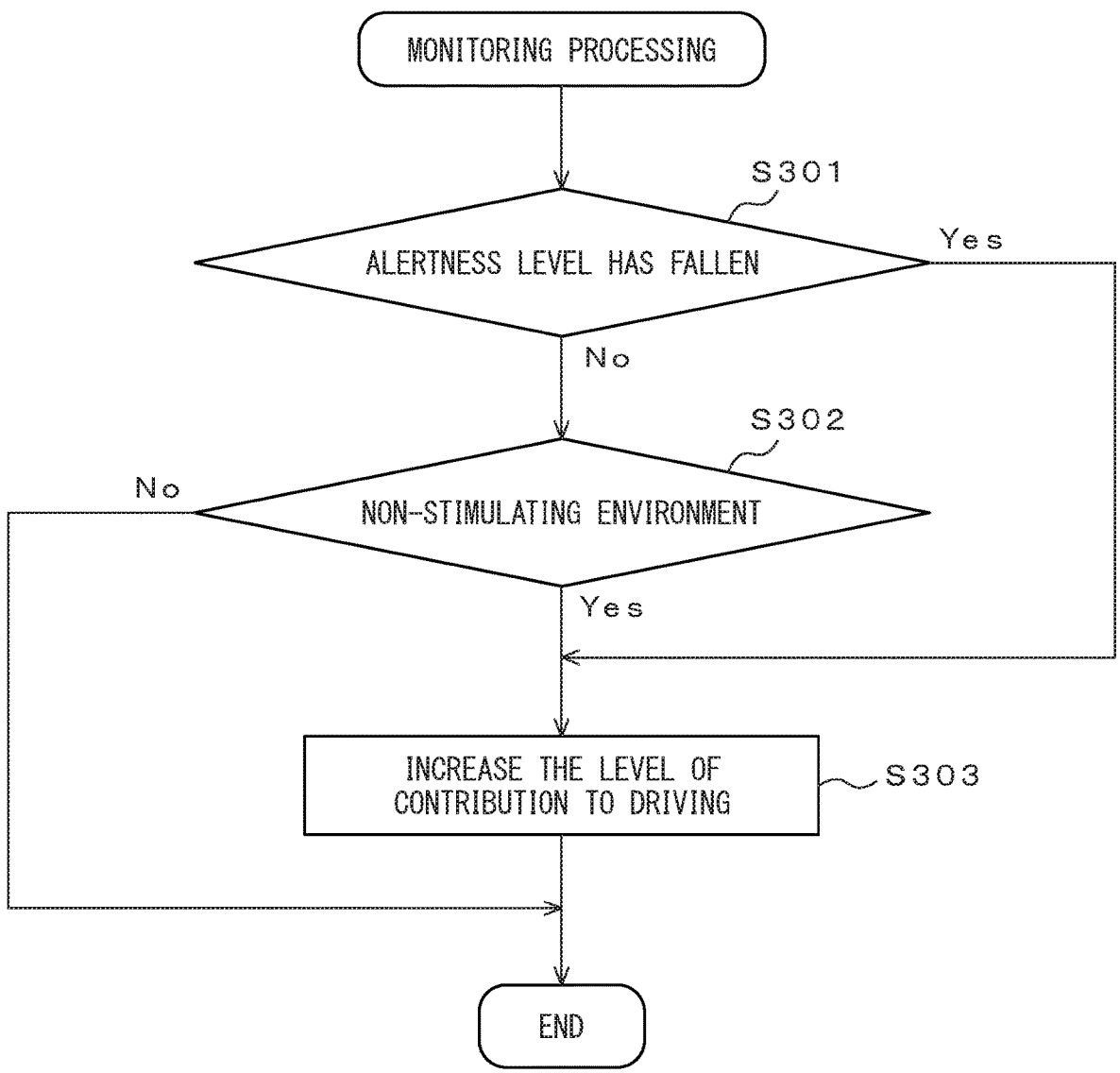

MONITORING DEVICE, STORAGE MEDIUM STORING COMPUTER PROGRAM FOR MONITORING, AND MONITORING METHOD

FIELD

The present disclosure relates to a monitoring device, a storage medium storing a computer program for monitoring, and a monitoring method.

BACKGROUND

Monitoring devices mounted in vehicles have conventionally been used to monitor driver states.

Some autonomous control systems for vehicles allow for a "hands-off" state where the driver's hands are released from the steering wheel when the vehicle is being driven under autonomous control.

When it has determined that the vehicle cannot be safely driven by autonomous control, however, the autonomous control system sends a request to the driver to shift driving of the vehicle from autonomous control to manual control (takeover request).

An autonomous control system therefore monitors the driver even when the vehicle is being driven under autonomous control, determining whether or not the driver is in a state capable of rapidly shifting to manual control in response to a takeover request (see Japanese Unexamined Patent Publication No. 2018-151907, for example).

SUMMARY

When a driver adopts a relaxed posture in a "hands-off" state while the vehicle is being driven under autonomous control, their degree of contribution to driving is usually reduced.

When a vehicle is being driven under autonomous control, the driver may not be able to rapidly shift to manual control in response to a takeover request if: (1) the driver has a lower alertness level, (2) the alertness level of the driver has begun to fall, or (3) the driver is alert but unable to focus on driving due to concentration on a mental task. Case (3) includes situations where the face and line of sight of the driver are facing forward but the driver is not consciously aware of driving, i.e. a state of "unfocused driving". Experience has shown that a driver will tend to enter a state of unfocused driving during monotonous travel of a vehicle on a high-speed road.

It is often possible to determine that a driver has a lowered alertness level based on an image of the driver's face. For example, it has been proposed to determine that the alertness level of a driver is lower based on the degree to which the driver's eyes or mouth are open.

However, it has been difficult to determine a state of initial lowered alertness level of a driver or a state of unfocused driving by the driver based on an image of the driver, since such states are not very noticeable from the driver's appearance.

It is an object of the present disclosure to provide a monitoring device that is able to estimate a state in which the alertness level of a driver has begun to fall, or a state of unfocused driving.

According to one embodiment, the invention provides a monitoring device. The monitoring device has an estimating unit that estimates whether or not a non-stimulating environment has appeared in front of a driver which may cause the driver to have a lower alertness level or to engage in unfocused driving based on multiple images taken of an environment ahead of the vehicle across a predetermined time period and a control unit that acts on the driver via a notification unit to increase a level of contribution to driving when the non-stimulating environment has appeared ahead.

This monitoring device preferably also has an index calculating unit that calculates an environment index representing the environment in front of the vehicle based on the multiple images, and wherein the estimating unit estimates whether or not the non-stimulating environment has appeared in front of the driver based on the environment index.

Preferably, the index calculating unit calculates number of other vehicles appearing in the multiple front images as the environment index, and the estimating unit estimates that the non-stimulating environment has appeared in front of the driver when the number of other vehicles appearing in the multiple front images is equal to or below a reference number within a reference time.

Also preferably, in the monitoring device, the index calculating unit calculates change in side regions of the multiple images as the environment index, and the estimating unit estimates that the non-stimulating environment has appeared in front of the driver when the degree of change in the side regions is equal to or below a first reference value or the side regions periodically change.

Also preferably, the index calculating unit in the monitoring device calculates the degree of change in the side regions based on colors or sizes of objects in the side regions.

Also preferably, in the monitoring device, the index calculating unit calculates changes in lower regions of the multiple images as the environment index, and the estimating unit estimates that the non-stimulating environment has appeared in front of the driver when the degree of change in the lower regions is below a second reference value or the lower regions periodically change.

Also preferably, in the monitoring device, the index calculating unit calculates the degree of change in the lower regions based on locations of road features in the lower regions.

Also preferably, in the monitoring device, the estimating unit estimates whether or not the non-stimulating environment has appeared in front of the driver based on the environment index using different conditions for daytime and nighttime.

The monitoring device also preferably comprises a driver monitoring unit that determines whether or not an alertness level of the driver has fallen, and wherein the notification control unit acts on the driver via a notification unit to increase a level of contribution to driving when the alertness level of the driver has fallen, and the estimating unit estimates whether or not the non-stimulating environment has appeared in front of the driver when the alertness level of the driver has not fallen.

According to another embodiment, a storage medium storing a computer program for monitoring is provided. The computer program for monitoring causes a processor execute a process, the process includes estimating whether or not a non-stimulating environment has appeared in front of a driver which may cause the driver to have a lower alertness level or to engage in unfocused driving, based on multiple images taken of an environment ahead of the vehicle across a predetermined time period and acting on the driver via a notification unit o increase a level of contribution to driving when the non-stimulating environment has appeared in front of the driver.

According to yet another embodiment of the invention there is provided a monitoring method. The monitoring method is carried out by a monitoring device and the method includes estimating whether or not a non-stimulating environment has appeared in front of a driver which may cause the driver to have a lower alertness level or to engage in unfocused driving, based on multiple images taken of an environment ahead of the vehicle across a predetermined time period and acting on the driver via a notification unit o increase a level of contribution to driving when the non-stimulating environment has appeared in front of the driver.

The monitoring device of the disclosure is able to estimate a state in which the alertness level of a driver has begun to fall, or a state of unfocused driving.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is an example of an operation flow chart for monitoring processing by the monitoring device of the embodiment.

DESCRIPTION OF EMBODIMENTS

Figure 1A:
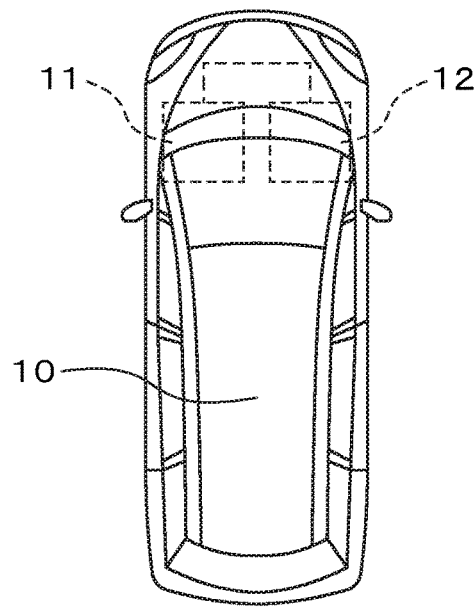
FIG. 1A is a diagram illustrating operation of the monitoring device of the embodiment in overview, and showing a vehicle.
Figure 1B:
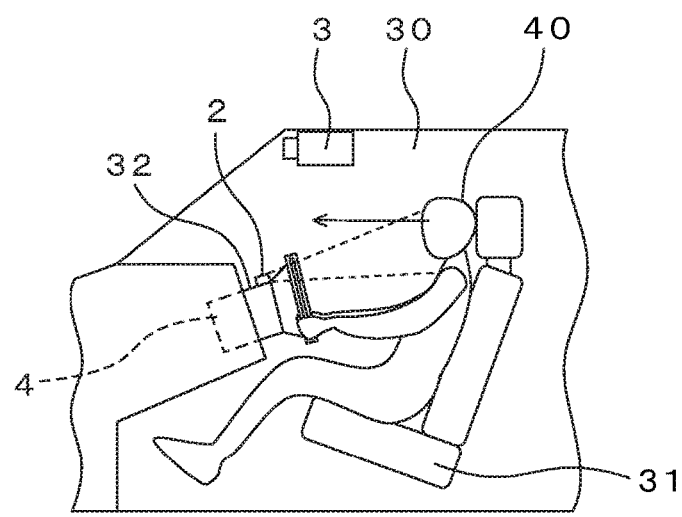
FIG. 1B is a diagram illustrating operation of the monitoring device of the embodiment in summary, where a surveillance camera is taking a facial image that includes the face of the driver.
Figure 1C:
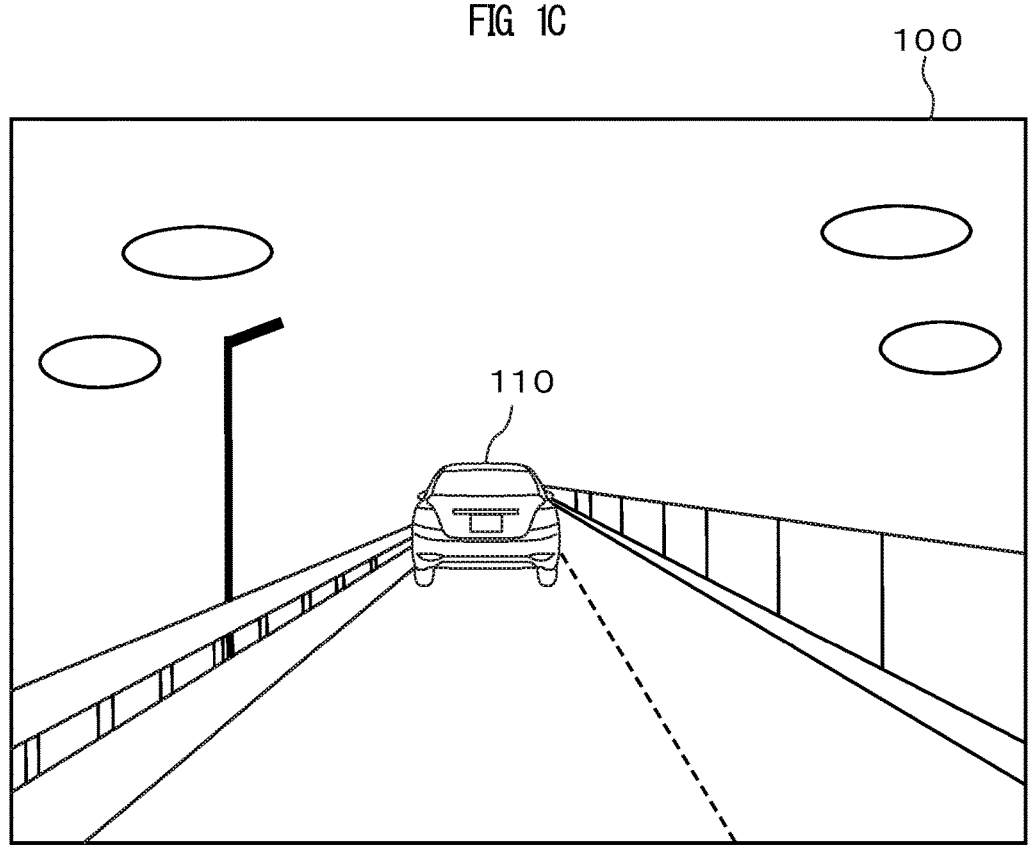
FIG. 1C is a diagram illustrating operation of the monitoring device of the embodiment in overview, and showing an example of a front image.

FIG. 1A to FIG. 1C are diagrams illustrating the monitoring device 12 of the embodiment in overview. FIG. 1A shows a vehicle, FIG. 1B shows a facial image including the face of the driver 40 being taken by a surveillance camera 2, and FIG. 1C shows an example of a front image 100.

As shown in FIG. 1A, the vehicle 10 has an autonomous control device 11 and monitoring device 12. In autonomous control mode in which driving of the vehicle 10 is mainly by the autonomous control device 11, the autonomous control device 11 drives the vehicle 10. In manual control mode in which driving of the vehicle 10 is mainly by the driver, on the other hand, the autonomous control device 11 controls operation of the vehicle 10 based on manipulation by the driver 40. The vehicle 10 may be an autonomous vehicle.

During autonomous control mode, the monitoring device 12 monitors conditions related to driving by the driver 40. As shown in FIG. 1B, the monitoring device 12 uses a surveillance camera 2 disposed on the steering column 32 in the compartment 30, to photograph a facial image including the face of the driver 40 who is sitting in the driving seat 31 and driving the vehicle 10. The monitoring device 12 also photographs a front image in which the environment in front of the vehicle 10 is represented, using a front camera 3 disposed above the driving seat 31 in the compartment 30.

In the example shown in FIG. 1C, the road in which the vehicle 10 is traveling and another vehicle 110 are represented in the front image 100. Also represented in the front image 100 are lane marking lines marking the traffic lane in which the vehicle 10 is traveling, road features including a guard rail and road lighting, and the landscape. The front image 100 represents the environment within the field of view of the driver 40 when the driver 40 sitting in the driving seat 31 is facing toward the front of the vehicle 10.

Based on the facial image, the monitoring device 12 estimates the level of contribution to driving by the driver 40. When the level of contribution of the driver 40 to driving is low, the monitoring device 12 determines that the alertness level of the driver 40 has fallen.

When the alertness level of the driver 40 has fallen, the monitoring device 12 acts on the driver to increase the level of contribution to driving, via a user interface (UI) 4. The manner of action may be displaying display information on the UI 4, or outputting audible information from the UI 4, for example.

When the alertness level of the driver 40 has not fallen, on the other hand, the monitoring device 12 estimates whether or not a non-stimulating environment has appeared in front of the driver which may cause the driver 40 to have a lower alertness level or to engage in unfocused driving, based on multiple front images taken over a predetermined period of time.

It is difficult to determine a state of initial lowered alertness level of the driver 40 or a state of unfocused driving by the driver 40 based on a facial image. The monitoring device 12 therefore estimates the state of initial lowered alertness level of the driver 40 or a state of unfocused driving by the driver 40 based on the environment depicted in the field of view of the driver 40.

For example, the monitoring device 12 calculates the number of other vehicles appearing in the multiple front images 100, and when the number of other vehicles appearing in the multiple front images 100 is equal to or below a reference number within a reference time, it estimates that a non-stimulating environment has appeared in front of the driver 40.

When the number of other vehicles appearing in the field of view of the driver 40 is small, it is possible that the field of view of the driver 40 has a continuous non-stimulating environment including a condition with low visual stimulation. The driver 40 may therefore begin to have a lower alertness level or may be a state of unfocused driving. As used herein, a "state of unfocused driving" includes a state in which the driver 40 is alert but is focused on a mental task and not concentrating on driving, and a state in which the face and line of sight of the driver 40 are directed forward but the mind of the driver 40 is not aware of driving.

When a non-stimulating environment has appeared ahead, the monitoring device 12 acts on the driver 40 to increase the level of contribution to driving, via the UI 4. The manner of action may be displaying display information on the UI 4, or outputting audible information from the UI 4, for example.

As mentioned above, the monitoring device 12 of this embodiment can estimate a state in which the alertness level of the driver has begun to fall, or a state of unfocused driving. When it is estimated that the driver is in a state of beginning to have a lower alertness level or in a state of unfocused driving, the monitoring device 12 may act on the driver 40 to increase the level of contribution to driving, to maintain a state in which the driver 40 is sufficiently contributing to driving of the vehicle 10.

Figure 2:
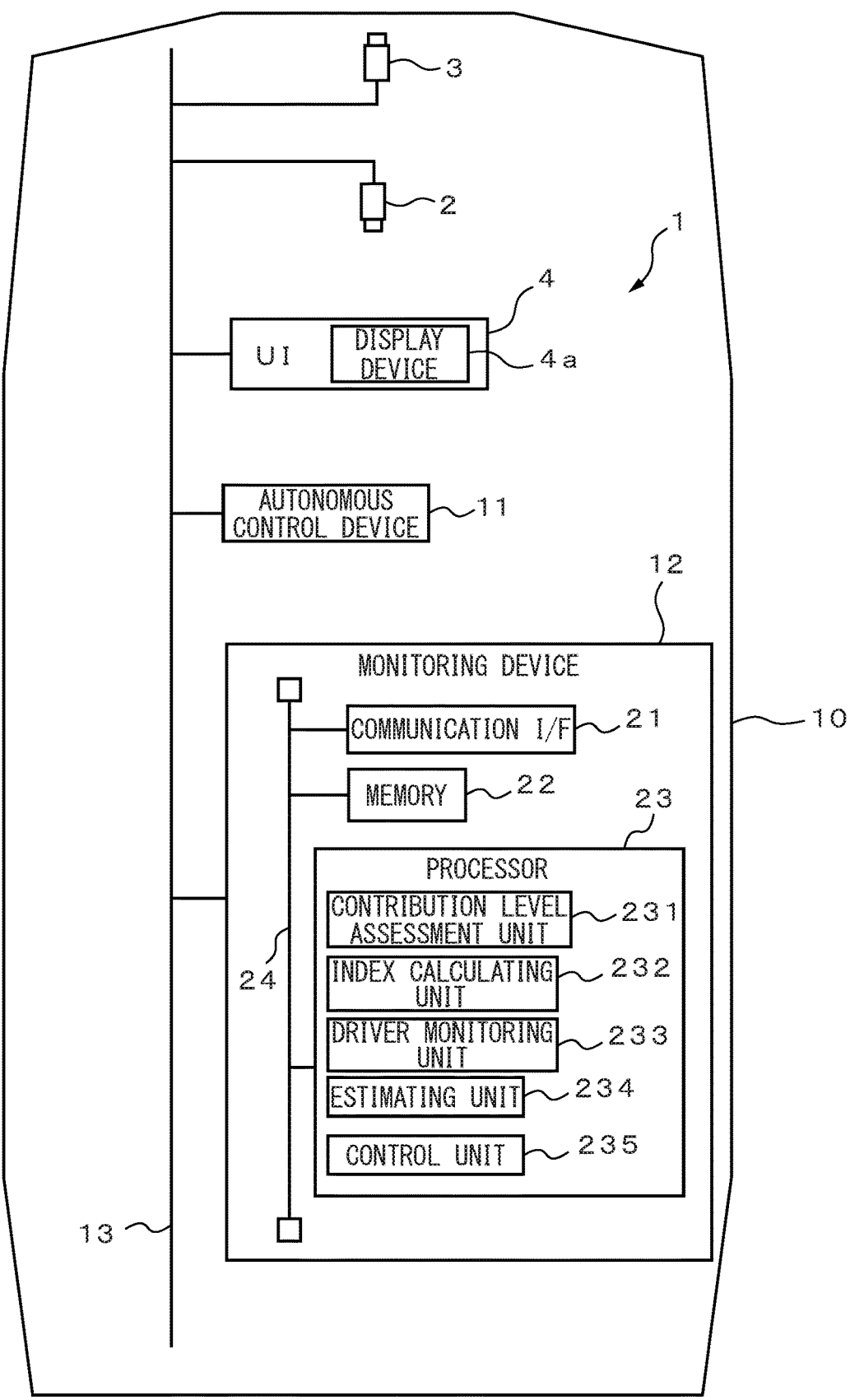
FIG. 2 is a general schematic drawing of a vehicle in which the monitoring device of the embodiment is mounted.

FIG. 2 is a general schematic drawing of a vehicle 10 in which the monitoring device 12 of the embodiment is mounted. The vehicle 10 has a surveillance camera 2, a front camera 3, a user interface (UI) 4, an autonomous control device 11 and a monitoring device 12, etc. The monitoring system 1 at least has a surveillance camera 2, a front camera 3, a user interface (UI) 4, and a monitoring device 12.

The surveillance camera 2, front camera 3, UI 4, autonomous control device 11 and monitoring device 12 are connected in a communicable manner via an in-vehicle network 13 conforming to the Controller Area Network standard.

The surveillance camera 2 is disposed in the compartment in a manner allowing it to photograph facial images including the face of the driver 40 driving the vehicle 10. The surveillance camera 2 is an example of a photographing device that takes facial images. The surveillance camera 2 is, specifically, an example of a photographing device that takes facial images including the face of the driver 40. The surveillance camera 2 is disposed on the steering column 32, for example, as shown in FIG. 1B. The surveillance camera 2 may also be disposed on the steering wheel, room mirror, meter panel or meter hood in the compartment.

The surveillance camera 2 photographs a facial image including the face of the driver 40 by photographing the area around the driving seat 31 at a facial imaging time at a predetermined cycle. The predetermined cycle may 0.1 to 1.0 second, for example. The predetermined cycle is not limited to this time range, however. Each time a facial image is taken, the surveillance camera 2 outputs the facial image and facial imaging time to the monitoring device 12, etc. via the in-vehicle network 13.

The surveillance camera 2 has a 2D detector composed of an array of photoelectric conversion elements with infrared sensitivity, such as a CCD or C-MOS, and an imaging optical system that forms an image of the photographed region on the 2D detector. The surveillance camera 2 preferably has a lighting device in addition to the 2D detector. The lighting device is a LED (light emitting diode), and for example, it may consist of two near-infrared LEDs situated on either side of the imaging optical system. Illuminating the driver with near-infrared light allows the driver's face to be photographed without causing discomfort for the driver even during low-illuminance periods such as nighttime.

The front camera 3 is mounted inside the compartment of the vehicle 10 and directed toward the front of the vehicle 10. The front camera 3 is an example of a photographing device that photographs front images representing the environment in front of the vehicle 10. The front camera 3 photographs a front image in which a predetermined region ahead of the vehicle 10 is represented, at a front imaging time set with a predetermined cycle. The predetermined cycle may 0.1 to 1.0 second, for example. The predetermined cycle is not limited to this time range, however. The front image represents the environment ahead of the driver 40. The front image may also show the road on which the vehicle 10 is traveling, lane marking lines on the road, road features including guard rails and road lightings, etc., objects including other vehicles, and the landscape including the sky. Each time a front image is taken, the front camera 3 outputs the front image and front imaging time to the monitoring device 12, etc. via the in-vehicle network 13.

The front camera 3 has a 2D detector composed of an array of photoelectric conversion elements with visible light sensitivity, such as a CCD or C-MOS, and an imaging optical system that forms an image of the photographed region on the 2D detector. The front camera 3 preferably has a wide visual field to include the field of view of the driver. For example, the front camera 3 preferably has a visual field of close to 180°.

The UI 4 is an example of the notification unit. The UI 4 is controlled by the autonomous control device 11 or monitoring device 12, and notifies the driver 40 of action information to increase the level of contribution to driving. The UI 4 has a display device 4a such as a liquid crystal display or touch panel, for display of the action information. The UI 4 may also have an acoustic output device (not shown) to notify the driver 40 of action information. The UI 4 also has a touch panel or operating button, for example, as an input device for inputting operation information from the driver to the vehicle 10. The UI 4 outputs the input operation information to the autonomous control device 11 or monitoring device 12 via the in-vehicle network 13.

As mentioned above, the autonomous control device 11 has an autonomous control mode in which the vehicle 10 is driven by autonomous control, and a manual control mode in which operation of the vehicle 10 is controlled based on manipulation by the driver 40. The autonomous control device 11 drives the vehicle 10 when in autonomous control mode. In autonomous control mode, the autonomous control device 11 controls operations such as steering, engine actuation and braking based on detection information from sensors (not shown) mounted in the vehicle 10.

In manual control mode, the autonomous control device 11 controls operation of the vehicle 10 including steering, engine actuation and braking, based on manipulation by the driver 40. In manual control mode, the autonomous control device 11 controls operation of the vehicle 10 based on manipulation of the steering wheel, for example, by the driver 40.

In autonomous control mode, driving is primarily executed by the autonomous control device 11. Autonomous control mode may also include driving at the self-driving levels of 3 to 5. In manual control mode, driving is primarily executed by the driver 40. Manual control mode may also include driving at the self-driving levels of 0 to 2.

When autonomous control mode begins, the autonomous control device 11 outputs an autonomous control mode start notification to the monitoring device 12 via the in-vehicle network 13. When manual control mode begins, the autonomous control device 11 outputs a manual control mode start notification to the monitoring device 12 via the in-vehicle network 13.

The autonomous control device 11 detects objects such as other vehicles surrounding the vehicle 10 based on detection information from sensors (not shown) mounted in the vehicle 10. In autonomous control mode, when it has been determined that the vehicle 10 cannot be safely driven, such as when a spacing of at least a predetermined distance cannot be maintained between the vehicle 10 and another object, the autonomous control device 11 notifies the driver 40 of a takeover request to switch main driving of the vehicle 10 from the autonomous control device 11 to the driver 40, via the UI 4.

Once the driver 40 has been notified of the takeover request, the autonomous control device 11 carries out control switching so that driving of the vehicle 10 is switched to the driver, at a predetermined control switching time. When notified of a takeover request, the driver 40 performs a predetermined acknowledgement action in response to the takeover request. Upon confirming the acknowledgement action, the autonomous control device 11 begins manual control mode. If no acknowledgement action by the driver 40 for the takeover request can be confirmed within the control switching time, the autonomous control device 11 safely stops the vehicle 10 (Minimal Risk Maneuver Processing).

The monitoring device 12 carries out contribution level assessment processing, index calculation processing, driver monitoring processing, estimation processing and control processing. For this purpose, the monitoring device 12 has a communication interface (IF) 21, a memory 22 and a processor 23. The communication interface 21, memory 22 and processor 23 are connected via signal wires 24. The communication interface 21 has an interface circuit to connect the monitoring device 12 with the in-vehicle network 13.

The memory 22 is an example of a memory unit, and it has a volatile semiconductor memory and a non-volatile semiconductor memory, for example. The memory 22 stores an application computer program and various data to be used for information processing carried out by the processor 23. The memory 22 also stores facial images input from the surveillance camera 2, in association with the facial imaging times. The memory 22 further stores front images input from the front camera 3, in association with the front imaging times.

All or some of the functions of the monitoring device 12 are functional modules driven by a computer program operating on the processor 23, for example. The processor 23 has a contribution level assessment unit 231, an index calculating unit 232, a driver monitoring unit 233, an estimating unit 234 and a control unit 235. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. Operation of the monitoring device 12 will be described in detail below.

The autonomous control device 11 and monitoring device 12 are electronic control units (ECU), for example. For FIG. 2, the autonomous control device 11 and the monitoring device 12 were described as separate devices, but all or some of the devices may also be constructed as a single device.

Figure 3:
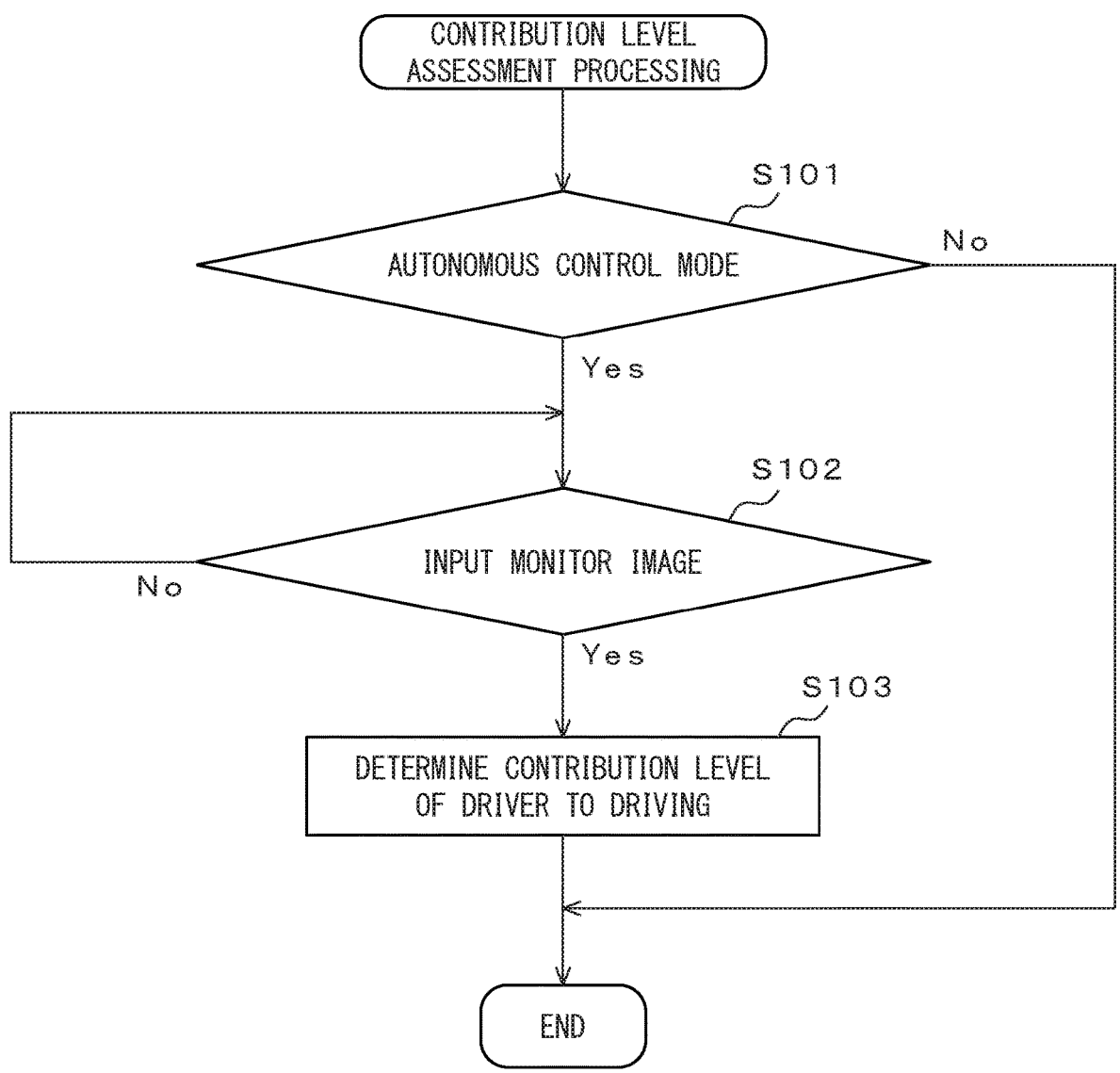
FIG. 3 is an example of an operation flow chart for contribution level assessment processing by the monitoring device of the embodiment.

FIG. 3 is an example of an operation flow chart for contribution level assessment processing by the monitoring device 12 of the embodiment. Contribution level assessment processing by the monitoring device 12 will be described below with reference to FIG. 3. The monitoring device 12 carries out contribution level estimation processing according to the operation flow chart shown in FIG. 3, at a contribution level assessment time at a predetermined cycle. The contribution level assessment time cycle is preferably equal to or shorter than the facial imaging time.

First, the contribution level assessment unit 231 determines whether or not the autonomous control device 11 is in autonomous control mode (step S101). After an autonomous control mode start notification has been input from the autonomous control device 11 and before the next manual control mode start notification has been input, the monitoring device 12 determines that the autonomous control device 11 is in autonomous control mode.

When the autonomous control device 11 is in autonomous control mode (step S101—Yes), the contribution level assessment unit 231 determines whether or not a facial image and facial imaging time have been newly input from the surveillance camera 2 through the in-vehicle network 13 (step S102).

When a facial image and facial imaging time have been newly input (step S102—Yes), the contribution level assessment unit 231 determines the level of contribution of the driver 40 to driving based on the facial image, and the series of processing steps is complete (step S103).

The contribution level assessment unit 231 detects the line of sight, the degree to which the eyes are open (hereunder also referred to as "degree of eye opening") and the degree to which the mouth is open (hereunder also referred to as "degree of mouth opening") for the driver 40, and determines the level of contribution of the driver 40 to driving based on the detected line of sight, degree of eye opening and degree of mouth opening, thus completing the series of processing steps. When the line of sight is out of a predetermined range that includes the front of the vehicle 10, the contribution level assessment unit 231 determines that the level of contribution of the driver 40 to driving is low. When the degree of eye opening is less than a predetermined reference value for the degree of eye opening or the degree of mouth opening is greater than a predetermined reference value for the degree of mouth opening, the contribution level assessment unit 231 likewise determines that the level of contribution of the driver 40 to driving is low. On the other hand, when the line of sight is within a predetermined range including the front of the vehicle 10, or the degree of eye opening is greater than a predetermined reference value for the degree of eye opening, or the degree of mouth opening is less than a predetermined reference value for the degree of mouth opening, the monitoring device 12 determines that the level of contribution of the driver 40 to driving is high.

When the autonomous control device 11 is not in autonomous control mode (step S101—No), the series of processing steps is complete.

When a facial image and front imaging time have not been newly input (step S102—No), processing returns to the start of step S102.

Figure 4:
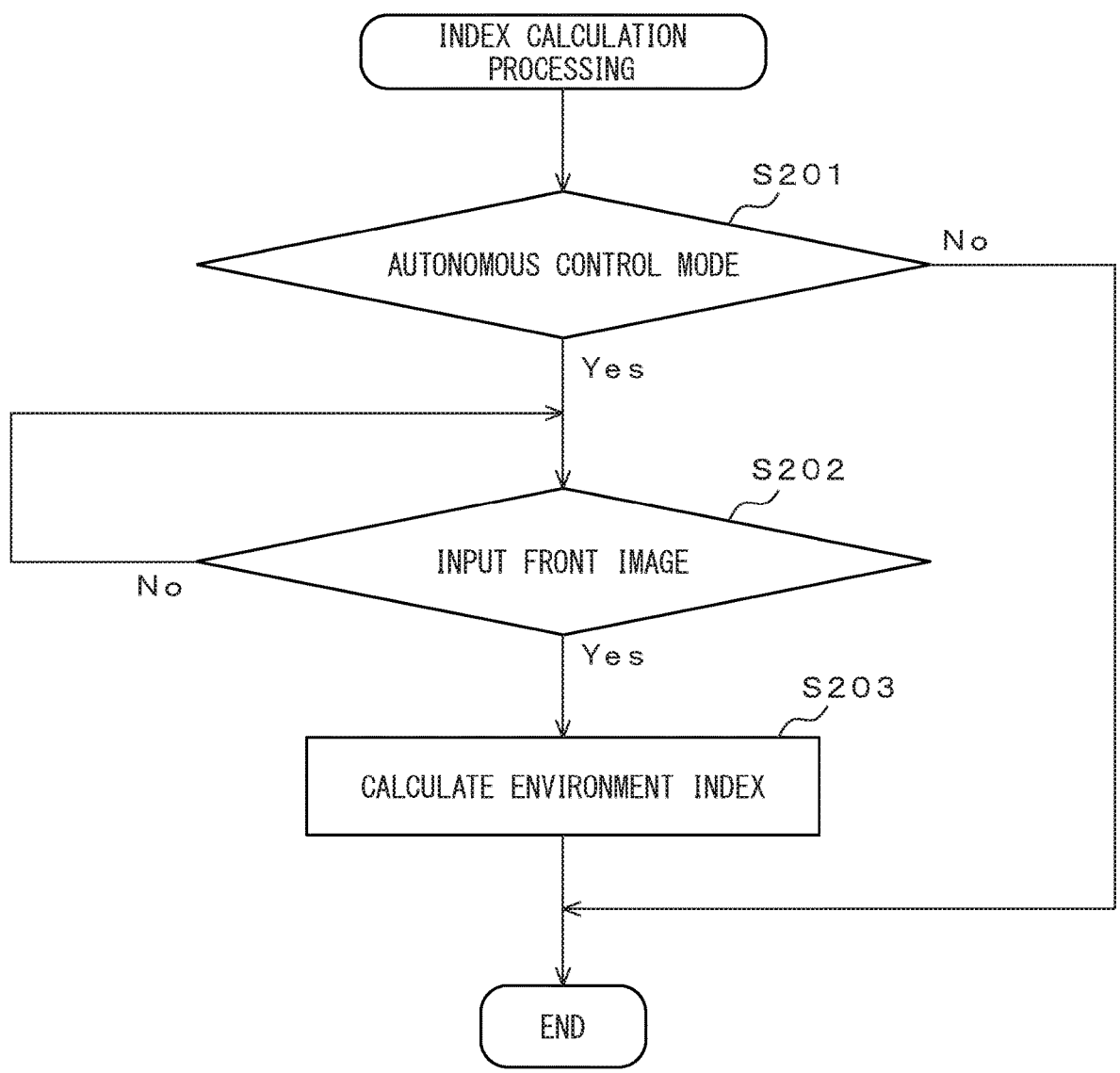
FIG. 4 is an example of an operation flow chart for index calculation processing by the monitoring device of the embodiment.

FIG. 4 is an example of an operation flow chart for index calculation processing by the monitoring device 12 of the embodiment. Index calculation processing by the monitoring device 12 will be described below with reference to FIG. 4. The monitoring device 12 carries out index calculation processing according to the operation flow chart shown in FIG. 4, at an index calculation time at a predetermined cycle. The index calculation time cycle is preferably equal to or shorter than the front imaging time.

First, the index calculating unit 232 determines whether or not the autonomous control device 11 is in autonomous control mode (step S201). After an autonomous control mode start notification has been input from the autonomous control device 11 and before the next manual control mode start notification has been input, the monitoring device 12 determines that the autonomous control device 11 is in autonomous control mode.

When the autonomous control device 11 is in autonomous control mode (step S201—Yes), the index calculating unit 232 determines whether or not a front image and front imaging time have been newly input from the front camera 3 through the in-vehicle network 13 (step S202).

When a front image and front imaging time have been newly input (step S202—Yes), the index calculating unit 232 calculates an environment index representing the environment in front of the vehicle 10, based on multiple front images taken over a predetermined index calculation time period, including the newly input front image (step S203), and the series of processing steps is complete.

The index calculation time period preferably includes a cycle in which multiple front images are taken. The index calculation time period may be 5 to 10 minutes, for example. The index calculation time period is not limited to this time range, however. For example, the index calculation time period may be changed depending on the type of road on which the vehicle 10 is traveling. When the vehicle 10 is traveling on an expressway, the index calculation time period may be shorter than when the vehicle 10 is traveling on a road other than an expressway. This is because a non-stimulating environment is more likely to appear in front of the driver 40 when the vehicle 10 is traveling on an expressway. Processing by which the index calculating unit 232 calculates an environment index will be explained below.

When the autonomous control device 11 is not in autonomous control mode (step S201—No), the series of processing steps is complete.

When a front image and front imaging time have not been newly input (step S202—No), processing returns to the start of step S202.

Processing by which the index calculating unit 232 calculates an environment index based on a front image will be explained below with reference to FIG. 1C, FIG. 6 and FIG. 7.

Processing Example 1

Another vehicle 110 appears in the front image 100 shown in FIG. 1C. The other vehicle 110 in the front image 100 may produce the environment depicted in the field of view of the driver 40. A lower number of other vehicles 110 in the field of view of the driver 40 may produce a less stimulating environment.

The index calculating unit 232 therefore calculates the number of other vehicles appearing in the multiple front images 100 over the index calculation time period, as the environment index. The index calculating unit 232 has a construction including a classifier that has learned to detect vehicles by input of a front image 100. The classifier inputs a front image 100 and outputs the type of vehicle and the region in the image in which the vehicle appears.

The classifier is a convolutional neural network (CNN) having multiple layers connected in series from the input end to the output end, for example. Images including vehicles are previously input into the CNN as teacher data for learning, whereby the CNN is able to function as a classifier to detect vehicle types and their regions in images. A machine learning model such as a support vector machine or random forest may also be used as the classifier.

The index calculating unit 232 assigns an ID No. and tracks any other vehicle detected in the front image 100. The index calculating unit 232 calculates the number of other vehicles appearing in the multiple front images 100 over the index calculation time period based on their ID Nos., as an environment index.

Processing Example 2

Figure 5:
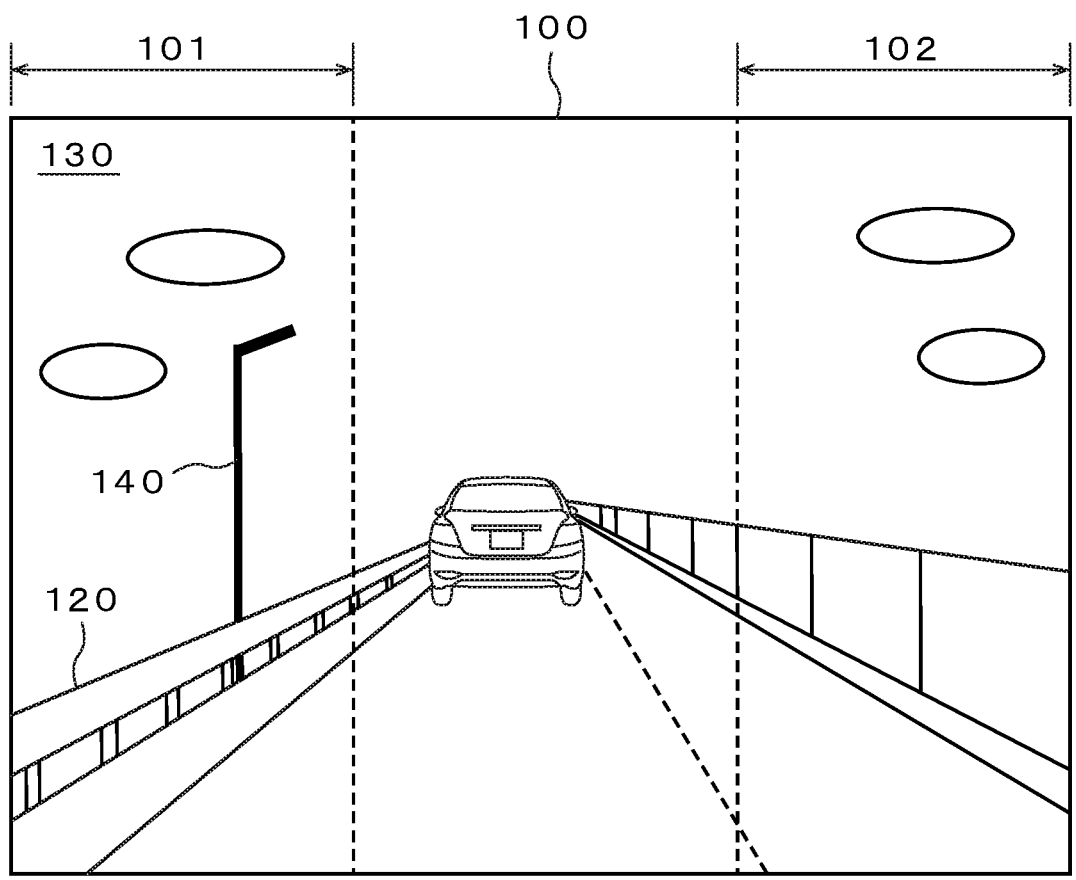
FIG. 5 is a diagram illustrating an example of index calculation processing.

Road features such as a guard rail 120 and road lamp 140, etc., as well as the sky 130, are shown in one side region of the front image 100 shown in FIG. 5. The side region of the front image 100 forms the environment depicted in the field of view of the driver 40. For example, if a monotonous road feature such as the guard rail 120, or a landscape component such as the sky 130 with the same continuous color appears in the field of view, this may produce a monotonous environment with a low degree of stimulation. Road lamps 140 periodically appearing in the field of view can also produce a monotonous environment with a low degree of stimulation.

The index calculating unit 232 therefore calculates changes in the side regions of multiple front images 100 over the index calculation time period, as the environment index. Road features or landscape components also appear at the center of front images 100, but identification of road features and landscape components in the side regions where they appear relatively big is preferred from the viewpoint of identification precision.

For Processing Example 2 specifically, the index calculating unit 232 calculates changes in each side region of a front image 100 based on the colors of road features in the side region of the front image 100. The index calculating unit 232 may also calculate changes in the left side region 101 and right side region 102 for multiple front images 100 over the index calculation time period, as the environment index. The index calculating unit 232 may also calculate changes in either the left side region 101 or right side region 102 for multiple front images 100 over the index calculation time period, as the environment index.

For example, ⅓ of the region on the left side in the transverse direction of the front image 100 may be designated as the left side region 101, and ⅓ of the region on the right side in the transverse direction of the front image 100 may be designated as the right side region 102. The left side region 101 and right side region 102 are not limited to being set in this manner, however.

Calculation of an environment index by the index calculating unit 232 using changes in the left side region 101 for multiple front images 100 over an index calculation time period will now be explained. This will also apply for Processing Examples 3 and 4.

The index calculating unit 232 has a construction including a classifier that has learned to detect road features such as guard rails and road lamps, and landscape components such as sky, by input of a front image 100. The classifier inputs a front image 100 and outputs the type of road feature or landscape component and the region in the image in which it appears. The landscape component may also be grass, trees or buildings such as houses.

The classifier is a convolutional neural network (CNN) having multiple layers connected in series from the input end to the output end, for example. Images including road features and landscape components are previously input into the CNN as teacher data for learning, whereby the CNN is able to function as a classifier to detect types of road features and landscape components and their regions in images. A machine learning model such as a support vector machine or random forest may also be used as the classifier.

A case where the road feature is a guard rail will now be explained. When a guard rail is included in the left side region 101 of multiple front images 100, the index calculating unit 232 determines the color of the guard rail. The pixel colors in each front image 100 are a composite of red, green and blue colors. The brightnesses of red, green and blue are each a value of 0 to 255. The index calculating unit 232 calculates an average value for the pixel colors (red, green and blue brightnesses) forming the region representing the guard rail in the left side region 101, for each of the multiple front images 100.

The index calculating unit 232 also calculates a statistical variation for the pixel colors (red, green and blue brightnesses) forming the region representing the guard rail in the left side region 101, for the multiple front images 100. Specifically, the index calculating unit 232 calculates the environment index to be the average value of dispersion for the average value for red, the average value for green and the average value for blue in the region representing the guard rail (hereunder referred to as "average color dispersion"). The average color dispersion for the guard rail represents the degree of change in the color of the guard rail. A smaller average color dispersion means that the guard rail exhibits the same color.

The index calculating unit 232 may also calculate the environment index to be the statistical variation of the colors of pixels forming road features other than the guard rail, for the multiple front images 100. The index calculating unit 232 may also calculate the environment index to be the statistical variation of the colors of pixels forming landscape components including the sky, for the multiple front images 100.

Processing Example 3

For Processing Example 3, the index calculating unit 232 calculates the environment index to be changes in the side region for each of multiple front images 100 over an index calculation time period, in the same manner as Processing Example 2. Specifically, for Processing Example 3, the index calculating unit 232 calculates changes in each side region based on the sizes of road features in the side region of each front image 100.

A case where the road feature is a guard rail will now be explained. When a guard rail is included in the left side region 101 of multiple front images 100, the index calculating unit 232 determines the size of the region representing the guard rail. Specifically, the index calculating unit 232 calculates the number of pixels forming the region representing the guard rail in the left side region 101, for each of the multiple front images 100.

The index calculating unit 232 also calculates a statistical variation for the number of pixels forming the region representing the guard rail in the left side region 101, for the multiple front images 100. Specifically, the index calculating unit 232 calculates the environment index to be the dispersion of the number of pixels in the region representing the guard rail (hereunder also referred to as "pixel count dispersion"). A smaller pixel count dispersion for a guard rail means that there is less change in the size of the guard rail.

The index calculating unit 232 may also calculate the environment index to be the statistical variation of the numbers of pixels forming road features other than the guard rail, for the multiple front images 100. The index calculating unit 232 may also calculate the environment index to be the statistical variation of the numbers of pixels forming landscape components including the sky, for the multiple front images 100.

Processing Example 4

For Processing Example 4, the index calculating unit 232 calculates the environment index to be changes in the side region for multiple front images 100 over an index calculation time period, in the same manner as Processing Example 2. Specifically, for Processing Example 4 the index calculating unit 232 calculates periodic change in the side region in the front images 100.

When a periodically placed road feature, such as a series of road lamps, is included in the left side region 101 of multiple front images 100, the index calculating unit 232 assigns an ID No. to the road feature and tracks it.

The following explanation assumes that the periodically placed road feature is a series of road lamps. The index calculating unit 232 determines the statistical variation during a time interval in which road lamps appear in multiple front images 100, based on times at which road lamps newly appear in the left side regions 101 of the front images 100 over the index calculation time period. The times at which road lamps newly appear are front image 100 photographing times in which road lamps are present. Specifically, the index calculating unit 232 calculates the environment index to be the dispersion of time intervals in which road lamps appear in the left side regions 101 of the front images 100. Lower dispersion of time intervals means that road lamps are periodically appearing in the field of view.

Processing Example 5

Figure 6:
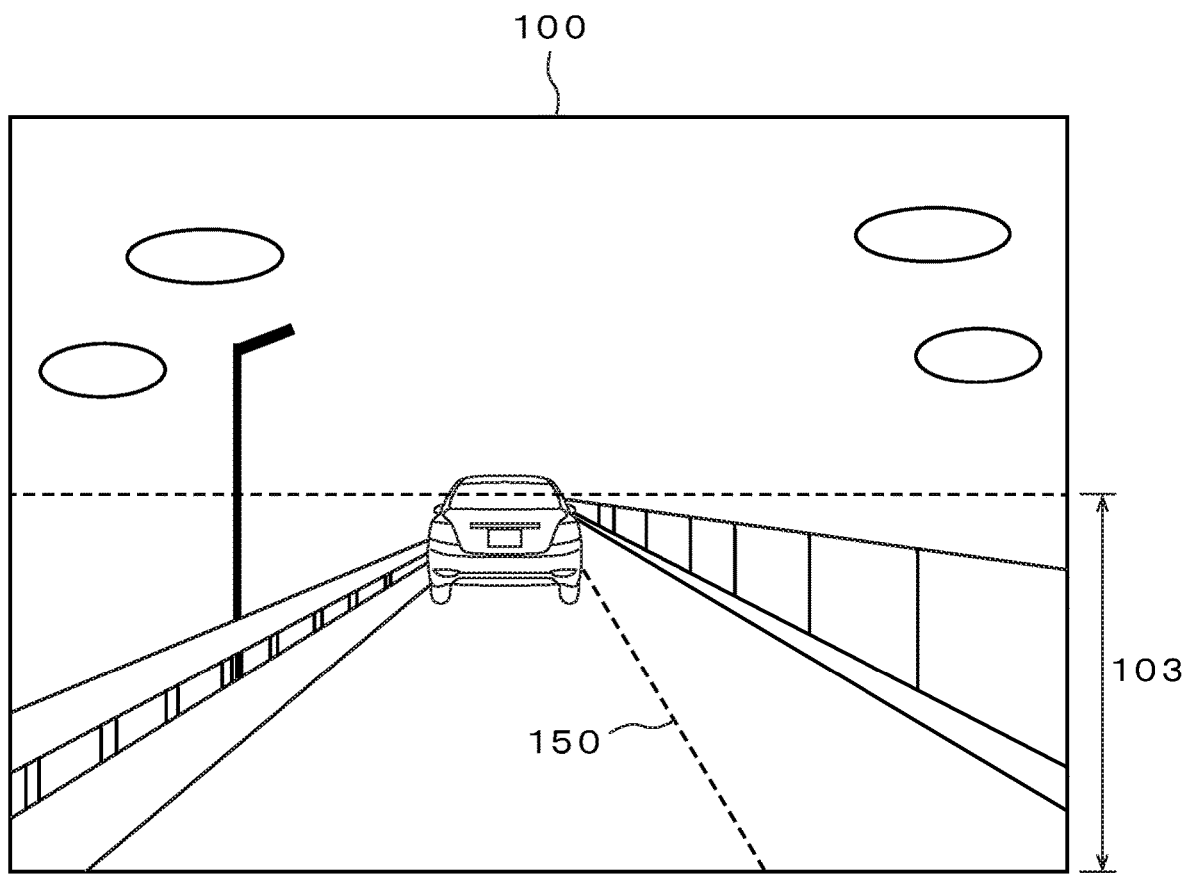
FIG. 6 is a diagram illustrating another example of index calculation processing.

In the lower region of the front image 100 shown in FIG. 6, road features such as the lane marking line 150 appear on the road on which the vehicle 10 is traveling. The lower region of the front image 100 forms the environment depicted in the field of view of the driver 40. For example, if a monotonous road feature such as the lane marking line 150 appears in the field of view, this may produce a monotonous environment with a low degree of stimulation. Other road features that may appear in the lower region of the front image 100 include lane separators (guide posts) and median strips.

The index calculating unit 232 therefore calculates changes in the lower regions of multiple front images 100 over the index calculation time period, as the environment index.

Specifically, for Processing Example 5, the index calculating unit 232 calculates changes in the lower region of a front image 100 based on the location of the road feature in the lower region of the front image 100. For example, the lower region 103 may be ½ of the region at the lower end in the vertical direction of the front image 100. The lower region 103 is not limited to being set in this manner, however.

The index calculating unit 232 has a construction including a classifier that has learned to detect road features such as lane marking lines, lane separators (guide posts) and median strips, by input of front images 100.

A case where the road feature is a lane marking line will now be explained. For each of the multiple front images 100, the index calculating unit 232 determines the location of the lane marking line 150 in the front image 100 when the lane marking line 150 is included in the lower region 103. For example, for each of the multiple front images 100, the index calculating unit 232 determines the location of the lane marking line 150 in the transverse direction at the lower end of the front image 100.

The index calculating unit 232 also determines the statistical variation of the location of the lane marking line 150 in the transverse direction at the lower end of the front image 100, for each of the multiple front images 100. Specifically, the index calculating unit 232 calculates the environment index to be the dispersion of the location of lane marking line 150 in the transverse direction at the lower ends of the front images 100 (hereunder also referred as "locational dispersion"). A smaller locational dispersion of the lane marking line 150 means smaller change in the location of the lane marking line 150.

Processing Example 6

For Processing Example 6, the index calculating unit 232 calculates the environment index to be changes in the lower regions 103 for multiple front images 100 over an index calculation time period, in the same manner as Processing Example 5. Specifically, for Processing Example 6, the index calculating unit 232 calculates periodic change in the lower regions in the front images 100.

When a periodically placed road feature, such as a lane separator (not shown), is included in the lower regions 103 of multiple front images 100, the index calculating unit 232 assigns an ID No. to the road feature and tracks it.

The following explanation assumes that the periodically placed road feature is a lane separator. The index calculating unit 232 determines the statistical variation during a time interval in which the lane separator appears in the front images 100, based on the times in which the lane separator has newly appeared in the lower regions 103 of the multiple front images 100 over the index calculation time period. The times at which the lane separator newly appears are front image 100 photographing times in which road lamps are present. Specifically, the index calculating unit 232 calculates the environment index to be the dispersion of time intervals in which the lane separator appears in the lower regions 103 of the front images 100. Lower dispersion of time intervals means that lane separator is periodically appearing in the field of view.

FIG. 7 is an example of an operation flow chart for monitoring processing by the monitoring device 12 of the embodiment. Monitoring processing by the monitoring device 12 will be described below with reference to FIG. 7. The monitoring device 12 carries out monitoring processing according to the operation flow chart shown in FIG. 7, at a monitoring time at a predetermined cycle. The cycle for the monitoring time is preferably equal to or longer than the contribution level estimating time or index calculation time period.

First, the driver monitoring unit 233 determines whether or not the alertness level of the driver has fallen, based on the level of contribution of the driver 40 to driving (step S301). When a low level of contribution of the driver 40 to driving has continued for a predetermined monitoring reference time, the driver monitoring unit 233 determines that the alertness level of the driver 40 has fallen (step S301—Yes). When a low level of contribution of the driver 40 to driving has not continued for the predetermined monitoring reference time, the driver monitoring unit 233 determines that the alertness level of the driver 40 has not fallen (step S301—No).

When the alertness level of the driver has fallen, the control unit 235 acts on the driver 40 to increase the level of contribution to driving via the UI 4 (step S303), and the series of processing steps is complete. The action may be notifying the driver 40 of the action information via the UI 4. The action information may be, for example, display information displayed on the UI 4, or audible information output from the UI 4. Display information displayed on the UI 4 may be an image that visually stimulates the driver, a request to face the front of the vehicle 10 or a request to grip the steering wheel. Audible information output from the UI 4 may be music that auditorily stimulates the driver, a request to face the front of the vehicle 10 or a request to grip the steering wheel.

When it has been determined that the alertness level of the driver 40 has not fallen after notification of the action information, the action to increase the level of contribution to driving by the driver 40 is stopped.

If the state of lower alertness level of the driver 40 has continued for a predetermined time period after notification of the action information, the control unit 235 may give the autonomous control device 11 a notification for a request to safely stop the vehicle 10, via the in-vehicle network 13.

When the alertness level of the driver 40 has not fallen, on the other hand, the estimating unit 234 estimates whether or not a non-stimulating environment has appeared in front of the driver 40, based on the environment index (step S302). The driver 40 may begin to have a lower alertness level or may be in a state of unfocused driving even if the alertness level of the driver 40 has not yet fallen. It is difficult to determine a state of initial lowering alertness level of the driver 40 or a state of unfocused driving by the driver 40 based on a facial image. The monitoring device 12 therefore estimates the state of initial lowered alertness level of the driver 40 or a state of unfocused driving by the driver 40 based on the environment depicted in the field of view of the driver 40. Operation by the estimating unit 234 for estimating whether or not a non-stimulating environment has appeared in front of the driver 40 will now be explained in detail.

When a non-stimulating environment has appeared in front of the driver 40 (step S302—Yes), the control unit 235 acts on the driver 40 to increase the level of contribution to driving via the UI 4 (step S303), and the series of processing steps is complete. The control unit 235 is an example of the notification control unit. The action may be notifying the driver 40 of the action information via the UI 4. The action information may be, for example, display information shown on the UI 4, or audible information output from the UI 4. Display information displayed on the UI 4 may be an image that visually stimulates the driver, a request to face the front of the vehicle 10 or a request to grip the steering wheel. Audible information output from the UI 4 may be music that auditorily stimulates the driver, a request to face the front of the vehicle 10 or a request to grip the steering wheel. The degree of action when a non-stimulating environment has appeared in front of the driver 40 may be lower than when the alertness level of the driver has fallen. This is because the driver 40 has not yet reached a level of lower alertness.

If the state of lower alertness level of the driver 40 has continued for a predetermined observation time after notification of the action information, the control unit 235 may give the autonomous control device 11 a notification for a request to safely stop the vehicle 10, via the in-vehicle network 13.

When a non-stimulating environment has not appeared in front of the driver (step S302—No), the series of processing steps is complete.

An example of operation by the estimating unit 234 for estimating whether or not a non-stimulating environment has appeared in front of the driver 40 will now be explained.

Operating Example 1

For Operating Example 1, the estimating unit 234 uses the number of other vehicles appearing in the multiple front images 100 over an index calculation time period as an environment index to estimate whether or not a non-stimulating environment has appeared in front of the driver 40.

When the number of other vehicles appearing in the multiple front images 100 within a reference time is less than a reference number, the estimating unit 234 estimates that a non-stimulating environment has appeared in front of the driver 40. When the number of other vehicles appearing in the multiple front images 100 within a reference time is greater than the reference number, the estimating unit 234 estimates that a non-stimulating environment has not appeared in front of the driver 40.

The reference time may be equal to or shorter than the index calculation time period. When the number of other vehicles 110 shown in the field of view of the driver 40 is small, there is less visual stimulation on the driver 40 and it is therefore estimated that a non-stimulating environment has appeared in front of the driver 40.

The reference number may also differ for daytime and nighttime. For example, the reference number during nighttime may be lower than during daytime. Because visual stimulation on the driver 40 is lower during nighttime than during daytime, the driver 40 is more likely to have a lower alertness level and to engage in unfocused driving. When the driver 40 drives primarily at nighttime, the reference number for daytime may instead be lower than for nighttime.

Operating Example 2

For Operating Example 2, the estimating unit 234 uses changes in the side regions of multiple front images 100 over an index calculation time period as an environment index to estimate whether or not a non-stimulating environment has appeared in front of the driver 40. When the degree of change in the side regions of multiple front images 100 is equal to or below a predetermined reference value, the estimating unit 234 estimates that a non-stimulating environment has appeared in front of the driver 40. When the degree of change in the side regions of multiple front images 100 is greater than the predetermined reference value, the estimating unit 234 estimates that a non-stimulating environment has not appeared in front of the driver 40.

For Operating Example 2, the estimating unit 234 calculates the degree of change in the side regions of the multiple front images 100 based on changes in the color of road features or landscape components.

A case where the road feature is a guard rail will now be explained. When the average color dispersion of the guard rail is equal to or below a predetermined reference value for color dispersion, the estimating unit 234 estimates that a non-stimulating environment has appeared in front of the driver 40. When the degree of change in the guard rail color is low there is less visual stimulation on the driver 40, and it may be that a non-stimulating environment has appeared in front of the driver 40.

The reference value for color dispersion may also differ for daytime and nighttime. For example, the reference value for color dispersion during nighttime may be lower than during daytime. Because visual stimulation on the driver 40 is lower during nighttime than during daytime, the driver 40 is more likely to have a lower alertness level and to engage in unfocused driving. When the driver 40 drives primarily at nighttime, the reference value for color dispersion for daytime may instead be lower than for nighttime. The use of different reference values for daytime and nighttime can also be applied for the other Operating Examples.

Operating Example 3

For Operating Example 3 as well, the estimating unit 234 uses changes in the side regions of multiple front images 100 over an index calculation time period as an environment index to estimate whether or not a non-stimulating environment has appeared in front of the driver 40. For Operating Example 3, the estimating unit 234 calculates the degree of change in the side regions of the multiple front images 100 based on the size of changes in the color of road features or landscape components. The estimating unit 234 may also calculate the degree of change in the side regions of multiple front images 100 based on the locations of road features in the side regions.

A case where the road feature is a guard rail will now be explained. When the pixel count dispersion of the guard rail is equal to or below a predetermined reference value for pixel count dispersion, the estimating unit 234 estimates that a non-stimulating environment has appeared in front of the driver 40. A smaller pixel count dispersion for a guard rail means that there is less change in the size of the guard rail. A smaller pixel count dispersion for a guard rail also generally means that there is less change in the shape of the guard rail. When the degree of change in the guard rail size or shape is low there is less visual stimulation on the driver 40, and it may be that a non-stimulating environment has appeared in front of the driver 40.

Operating Example 4

For Operating Example 4 as well, the estimating unit 234 uses changes in the side regions of multiple front images 100 over an index calculation time period as an environment index to estimate whether or not a non-stimulating environment has appeared in front of the driver 40. For Operating Example 4, the estimating unit 234 uses periodic changes in the side regions of front images 100 as an environment index to estimate whether or not a non-stimulating environment has appeared in front of the driver 40.

The following explanation assumes that the periodically placed road feature is a series of road lamps. When the time interval dispersion at which road lamps appear in the left side regions of front images 100 is equal to or below a predetermined reference value for time dispersion, the estimating unit 234 estimates that a non-stimulating environment has appeared in front of the driver 40. A time interval dispersion equal to or below the predetermined reference value for time dispersion means that side regions periodically change in the front images 100. A condition with low time interval dispersion of appearance of road lamps in the left side regions of front images 100 may be, for example, a condition of low acceleration in the traveling direction of the vehicle 10. When road lamps appear at approximately the same time interval, less visual stimulation and dynamic stimulation are experienced by the driver 40, and therefore it may be that a non-stimulating environment has appeared in front of the driver 40.

Operating Example 5

For Operating Example 5, the estimating unit 234 uses changes in the lower regions of multiple front images 100 over an index calculation time period as an environment index to estimate whether or not a non-stimulating environment has appeared in front of the driver 40. When the degree of change in the lower regions of multiple front images 100 is equal to or below a predetermined reference value, the estimating unit 234 estimates that a non-stimulating environment has appeared in front of the driver 40. When the degree of change in the lower regions of multiple front images 100 is greater than the predetermined reference value, the estimating unit 234 estimates that a non-stimulating environment has not appeared in front of the driver 40.

For Operating Example 5, the estimating unit 234 may also calculate the degree of change in the lower regions of multiple front images 100 based on the locations of road features in the lower regions. The estimating unit 234 may also calculate the degree of change in the lower regions of multiple front images 100 based on the colors or sizes of road features in the lower regions.

A case where the road feature is a lane marking line will now be explained. When the locational dispersion of a lane marking line in the transverse direction at the lower ends of front images 100 is equal to or below a predetermined reference value for locational dispersion, the estimating unit 234 estimates that a non-stimulating environment has appeared in front of the driver 40. A smaller locational dispersion of the lane marking line 150 means smaller change in the location of the lane marking line 150. A condition with low change in the location of the lane marking line 150 may be, for example, a condition with low acceleration in the transverse direction perpendicular to the traveling direction of the vehicle 10. When the location of the lane marking line 150 is approximately the same, less visual stimulation and dynamic stimulation are experienced by the driver 40, and therefore it may be that a non-stimulating environment has appeared in front of the driver 40.

Operating Example 6

For Operating Example 6 as well, the estimating unit 234 uses changes in the lower regions of multiple front images 100 over an index calculation time period as an environment index to estimate whether or not a non-stimulating environment has appeared in front of the driver 40. For Operating Example 6, the estimating unit 234 uses periodic changes in the lower regions of front images 100 as an environment index to estimate whether or not a non-stimulating environment has appeared in front of the driver 40.

The following explanation assumes that the periodically placed road feature is a lane separator. When the time interval dispersion at which the lane separator appears in the lower regions of front images 100 is equal to or below a predetermined reference value for time dispersion, the estimating unit 234 estimates that a non-stimulating environment has appeared in front of the driver 40. A time interval dispersion equal to or below the predetermined reference value for time dispersion means that lower regions periodically change in the front images 100. A condition with low time interval dispersion of appearance of a lane separator in the lower regions of front images 100 may be, for example, a condition of low acceleration in the traveling direction of the vehicle 10. When a lane separator appears at approximately the same time interval, less visual stimulation and dynamic stimulation are experienced by the driver 40, and therefore it may be that a non-stimulating environment has appeared in front of the driver 40.

As mentioned above, the monitoring device of this embodiment can estimate a state in which the alertness level of the driver has begun to fall, or a state of unfocused driving. When it is estimated that the driver is in a state of beginning to have a lower alertness level or in a state of unfocused driving, the monitoring device can also act on the driver to increase the level of contribution to driving, to maintain a state in which the driver is sufficiently contributing to driving of the vehicle.

In order to increase the level of contribution to driving by a driver who is in a state of beginning to have a lower alertness level or a state of unfocused driving, it has been common in the past to notify the driver of a "hands-on" request to take hold of the steering wheel at a predetermined cycle. However, hands-on requests have often been annoying for drivers in an alert state. The monitoring device of this embodiment, however, acts to increase the level of contribution to driving by the driver when it has been estimated that a non-stimulating environment has appeared in front of the driver, and therefore does not act when a non-stimulating environment has not appeared in front of the driver. This allows the monitoring device to provide a more comfortable driving experience for the driver.

The monitoring device, computer program for monitoring and monitoring method according to the embodiments described in the present disclosure may incorporate appropriate modifications that still fall within the gist of the disclosure. Moreover, the technical scope of the disclosure is not limited to these embodiments, and includes the invention and its equivalents as laid out in the Claims.

Although the environment index was calculated based on changes in the side regions or lower regions of front images in the embodiment described above, the environment index may also be calculated based on other regions. For example, the environment index may be calculated based on the center regions or upper regions of front images.

The calculation method by which the environment index is calculated based on front images is also not limited to the one described for the embodiment.

Moreover, for the embodiment described above, notification of action information was given via the UI 4 to increase the level of contribution of the driver to driving, but the action is not limited to such notification. For example, the action may be vibration of the driving seat in which the driver is sitting using a drive unit for vibration of the driving seat, or change in the brightness (for example, increased brightness) of display of the display information on the UI, or increase in the flow rate of air blown using the air conditioner.

The invention claimed is:

1. A monitoring device comprising:
a processor configured to
estimate whether or not a non-stimulating environment has appeared in front of a driver which may cause the driver to have a lower alertness level or to engage in unfocused driving, based on multiple images taken of an environment ahead of a vehicle across a predetermined time period,
calculate an environment index representing the environment in front of the vehicle based on the multiple images,
estimate whether or not the non-stimulating environment has appeared in front of the driver based on the environment index,
calculate a number of other vehicles appearing in the multiple front images as the environment index,
estimate that the non-stimulating environment has appeared in front of the driver when the number of other vehicles appearing in the multiple front images is equal to or below a reference number within a reference time, and
act on the driver via a notification unit to increase a level of contribution to driving when the non-stimulating environment has appeared ahead.

2. The monitoring device according to claim 1, wherein the processor is further configured to calculate change in side regions of the multiple images as the environment index, and estimate that the non-stimulating environment has appeared in front of the driver when degree of change in the side regions is equal to or below a first reference value or the side regions periodically change.

3. The monitoring device according to claim 2, wherein the processor is further configured to calculate the degree of change in the side regions based on colors or sizes of objects in the side regions.

4. The monitoring device according to claim 1, wherein the processor is further configured to calculate changes in lower regions of the multiple images as the environment index, and estimate that the non-stimulating environment has appeared in front of the driver when degree of change in the lower regions is equal to or below a second reference value or the lower regions periodically change.

5. The monitoring device according to claim 4, wherein the processor is further configured to calculate the degree of change in the lower regions based on locations of road features in the lower region.

6. The monitoring device according to claim 1, wherein the processor is further configured to estimate whether or not the non-stimulating environment has appeared in front of the driver based on the environment index using different conditions for daytime and nighttime.

7. The monitoring device according to claim 1, wherein the processor is further configured to determine whether or not an alertness level of the driver has fallen, act on the driver via a notification unit to increase a level of contribution to driving when the alertness level of the driver has fallen, and estimate whether or not the non-stimulating environment has appeared in front of the driver when the alertness level of the driver has not fallen.

8. A computer-readable, non-transitory storage medium storing a computer program for monitoring, which causes a processor execute a process, the process comprising:

estimating whether or not a non-stimulating environment has appeared in front of a driver which may cause the driver to have a lower alertness level or to engage in unfocused driving, based on multiple images taken of an environment ahead of a vehicle across a predetermined time period;

calculating an environment index representing the environment in front of the vehicle based on the multiple images;

estimating whether or not the non-stimulating environment has appeared in front of the driver based on the environment index;

calculating a number of other vehicles appearing in the multiple front images as the environment index;

estimating that the non-stimulating environment has appeared in front of the driver when the number of other vehicles appearing in the multiple front images is equal to or below a reference number within a reference time; and acting on the driver via a notification unit to increase a level of contribution to driving when the non-stimulating environment has appeared in front of the driver.

9. A monitoring method carried out by a monitoring device and the method comprising:

estimating whether or not a non-stimulating environment has appeared in front of a driver which may cause the driver to have a lower alertness level or to engage in unfocused driving, based on multiple images taken of an environment ahead of a vehicle across a predetermined time period;

calculating an environment index representing the environment in front of the vehicle based on the multiple images;

estimating whether or not the non-stimulating environment has appeared in front of the driver based on the environment index;

calculating a number of other vehicles appearing in the multiple front images as the environment index;

estimating that the non-stimulating environment has appeared in front of the driver when the number of other vehicles appearing in the multiple front images is equal to or below a reference number within a reference time; and acting on the driver via a notification unit to increase a level of contribution to driving when the non-stimulating environment has appeared in front of the driver.

* * * * *